United States Patent [19]
Dolikian

[11] 4,455,617
[45] Jun. 19, 1984

[54] MULTIPLE SIMULTANEOUS TONE DECODER

[75] Inventor: Arman V. Dolikian, Palatine, Ill.

[73] Assignee: Motorola, Inc., Schaumburg, Ill.

[21] Appl. No.: 412,628

[22] Filed: Aug. 30, 1982

[51] Int. Cl.[3] .................... G06F 15/31; H04M 1/50
[52] U.S. Cl. .................... 364/724; 364/825; 179/84 VF
[58] Field of Search .................... 364/724, 825, 484; 179/84 VF; 328/138, 140

[56] References Cited

U.S. PATENT DOCUMENTS

| | | | |
|---|---|---|---|
| 3,577,080 | 5/1971 | Cannalte | 325/183 |
| 3,835,394 | 9/1974 | Stolt et al. | 325/321 |
| 3,990,007 | 11/1976 | Hohhof | 324/780 |
| 4,021,653 | 5/1977 | Sharp et al. | 235/152 |
| 4,061,885 | 12/1977 | Nash et al. | 179/84 VF |
| 4,216,463 | 8/1980 | Backof, Jr. et al. | 340/171 R |
| 4,258,423 | 3/1981 | Lane et al. | 364/484 |
| 4,302,817 | 11/1981 | Labedz | 364/724 |
| 4,326,256 | 4/1982 | Furumoto | 364/484 |
| 4,328,398 | 5/1982 | Kawaguchi et al. | 179/84 VF |
| 4,354,248 | 10/1982 | Conger et al. | 364/724 |

*Primary Examiner*—David H. Malzahn
*Attorney, Agent, or Firm*—Joan Pennington; Edward M. Roney; James W. Gillman

[57] ABSTRACT

The invention is a decoder for decoding serially received signals. The decoder includes circuitry for calculating the period of each signal in a group of the serially received signals. The decoder averages the periods of the group and calculates the groups average variance. Additional circuitry in the decoder calculates an average variance threshold. Detection circuitry within the decoder takes the average period, the average variance and the average variance threshold of the group of signals and produces a detection signal when the average period remains constant and the average variance remains below the average variance threshold for a predetermined minimum time period.

12 Claims, 7 Drawing Figures

MULTIPLE SIMULTANEOUS TONE DECODER

BACKGROUND OF THE INVENTION

This invention deals with multiple simultaneous tone decoding and more particularly with multiple simultaneous tone decoding at a remote location such as a radio transmitter site. The coded tones are sent from a dispatch point to a transmitter decoder which serves to control the transmitter site operation.

This invention is related to U.S. Pat. No. 3,577,080 to Cannalte and is herein incorporated by reference. In the Cannalte patent a short burst of a high amplitude "guard" tone is applied over a single audio channel from a dispatch point to a remote transmitter decoder for the purpose of activating a control function at the transmitter site. After the transmitter decoder has received a high level guard tone audio signal, the dispatch point then transmits different tones (function tones) over the audio channel to actuate different control functions within the transmitter.

The invention is an improved implementation of the transmitter decoder using the control signalling system of the Cannalte patent. According to the signalling system when a dispatch point wants to send a command to a remote transmitter station, it sends a two tone sequence via a wire line path. As mentioned, the first tone is referred to as a high level guard tone. It is a fixed frequency and serves to prepare the transmitter to receive a second tone. The second tone is commonly referred to as a function tone. Unlike the guard tone, the function tone can be one of many different frequencies. Each function tone frequency signifies a unique command when received by the transmitter. Since the transmitter decoder does not know which function tone will be sent after it receives a high level guard tone, the prior art transmitter decoder uses a separate decoder circuit for each of the possible defined function tones. The need to replicate a tone decoder for every tone has many disadvantages, some of them being high cost, large size, high parts count and components which are highly sensitive to changes in the ambient environment. These components need to be manually tuned and have been shown to drift with time, vibration and temperature. Also, each of the tone decoders operate independently and it is therefore possible for more than one of the multiple tone decoders to simultaneously indicate a detection of an associated tone thus creating undefined fault conditions.

It is the object of this invention to provide a single tone decoder to decode all of the possible function tones.

It is a further object of the invention to provide a tone decoder which will choose only the strongest tone present.

It is also an object of this invention to provide a decoder which utilizes both the average period of a sampled portion of the received tone and the variance of each period within the sample as an indication of valid detection of a function tone.

SUMMARY OF THE INVENTION

The invention is a decoder for decoding serially received signals. The decoder includes circuitry for calculating the period of each signal in a group of the serially received signals. The decoder averages the periods of the group and calculates the average variance. Additional circuitry in the decoder calculates an average variance threshold. Detection circuitry within the decoder takes the average period, the average variance and the average variance threshold of the group of signals and produces a detection signal when the average period remains constant and the average variance remains below the average variance threshold for a predetermined minimum time period.

FIGS. *6a* and *6b* are flowcharts of the foreground activity in a software embodiment of the transmitter decoder according to the invention.

DETAILED DESCRIPTION OF THE PREFERRED EMBODIMENT

Figure 1:
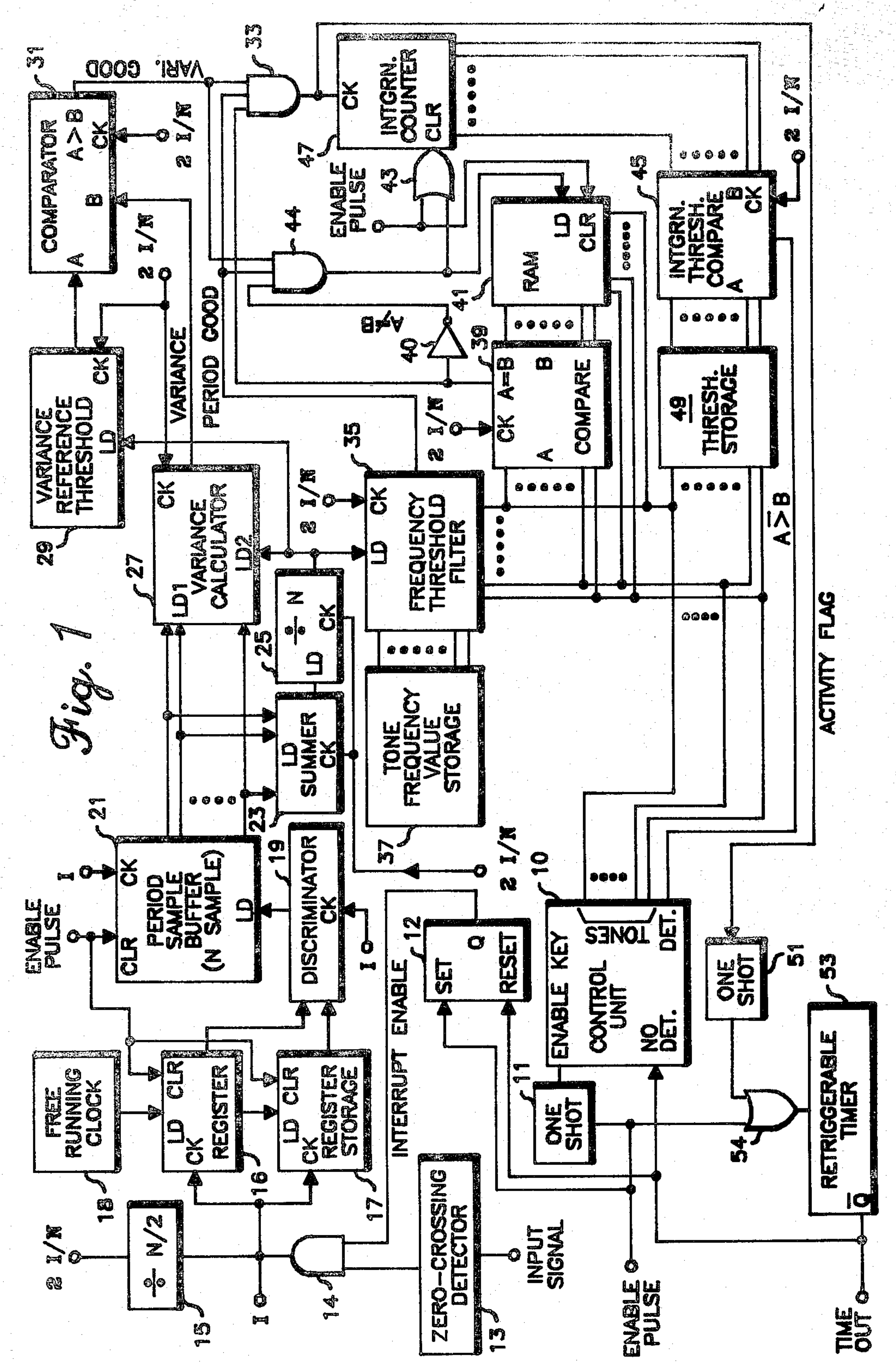
FIG. 1 is a schematic block diagram of the transmitter decoder according to the invention.

FIG. 1 shows a schematic block diagram of the transmitter decoder according to the invention. The decoder determines if a valid tone has been received for a predetermined minimum amount of time. The decoder circuit of FIG. 1 begins operation when an enable key is activated at the control unit 10. The control unit 10 may be any part of the transmitter of which the decoder is a part. For example, the control unit 10 can be nothing more than lights and an enable key on a panel which is under operator control.

Operation of the enable key of control unit 10 triggers a one shot 11 which responds with an enable pulse at the one shot output. The enable pulse is an input to the set input of flip-flop 12. The Q output of flip-flop 12 is an interrupt enable signal which unblocks the output of a zero-crossing detector 13 by enabling AND gate 14. The Q output of flip-flop 12 and the output of zero-crossing detector 13 supply the two inputs to AND gate 14. Zero-crossing detector 13 is responsive to audio tones at its input to provide a squared-up output signal of the same frequency as the audio tone input. On every negative-to-positive transition of the input signal to the zero-crossing detector 13, an interrupt signal is generated which serves as the time base for the decoder. The output of AND gate 14 is an interrupt signal (I) which serves to directly clock a portion of the decoder. A divide by N/2 circuit 15 divides the interrupt signal by a value N/2 where N is the number of sample registers in the decoder (to be discussed later). If N equals eight, then divide by N/2 circuit 15 serves to output a pulse every fourth time that the interrupt signal (I) occurs. The output of the divide by N/2 circuit 15 is a secondary interrupt signal labeled 2I/N in FIG. 1. The two signals I and 2I/N provide all the clock inputs to the various component parts of the decoder in FIG. 1. Each clock pulse allows the decoder to perform a new calculation.

A register 16, a storage register 17 and a free running clock 18 cooperate to store a analog value representative of the time of occurrence of two successive interrupt signals (I). Register 16 and storage register 17 receive the interrupt signal (I) at their clock inputs. When register 16 receives the interrupt signal (I) at its clock input, register 16 stores and holds the reading of the free running clock 18 present at its load input. Register storage 17, in response to receiving the interrupt signal (I) at its clock input, stores the information present at its load input. That information is the contents of register 16 which represents the analog value of the free running clock 18 at the previous interrupt signal (I) from the zero-crossing detector 13. The values stored in register 16 and register storage 17 are compared in a discriminator 19. The analog difference in value between register 16 and register storage 17 represents the time period between successive interrupt signals (I) which is the frequency period of the incoming tone.

The difference signal from discriminator 19 is supplied the load input to a period sample buffer 21 which holds the N most recent outputs of discriminator 19. The period sample buffer 21, shifts its contents in response to the interrupt signal (I) received at its clock input. By shifting the contents of the period sample buffer 21 the difference signal from discriminator 19 is loaded into the first buffer location. The contents of the Nth buffer location is dropped and the Nth buffer location assumes the value that was previously in the N−1 buffer location. At every secondary interrupt (2I/N) the N outputs of the period sample buffer 21 are loaded into a summer circuit 23 which adds the N outputs and provides the results to a load input of a divide by N circuit 25. The divide by N circuit 25 is clocked by the secondary interrupt (2I/N) so that it performs a new calculation only when the summer 23 calculates a new sum from the N outputs of the period sample buffer. The output from the divide by N circuit 25 is a analog value representing the average period of the N periods stored in the period sample buffer 21. Since the summer 23 and divide by N circuit 25 are clocked by the secondary interrupt signal (2I/N), a new average period is calculated only twice in a full cycle of the period sample buffer 21. Therefore each sample is included twice in calculations of the average period. All the circuitry which follows the summer 23 and the divide by N circuit 25 in the decoder signal processing chain is clocked by the secondary interrupt signal (2I/N) since new values for the average period are calculated only at that time.

Figure 2:
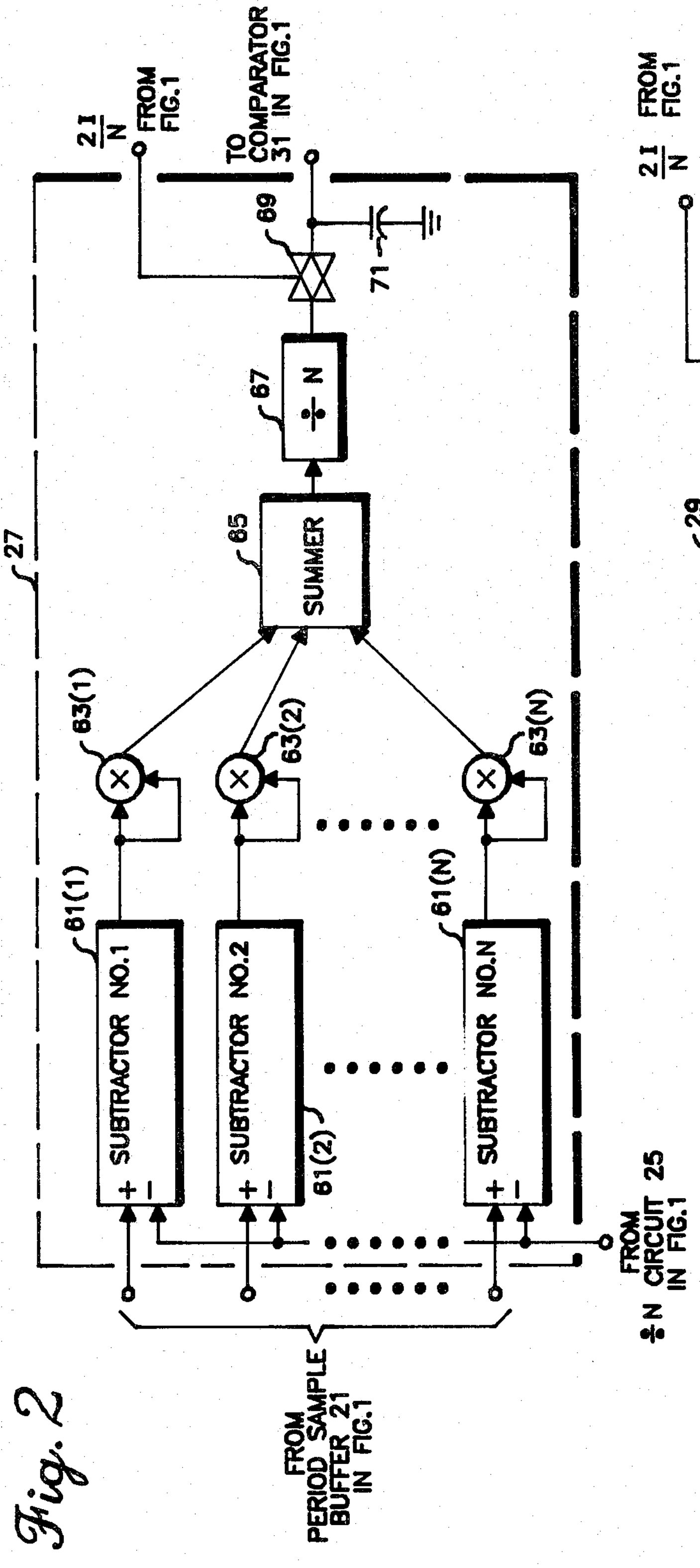
FIG. 2 is a circuit diagram of the variance calculator block of FIG. 1.

The N outputs of period sample buffer 21 are also loaded (at LD1) into a variance calculator 27. In addition the variance calculator 27 receives at a load input (LD2) the average period signal from divide by N circuit 25. The variance calculator 27 loads these signals present at its inputs every secondary interrupt (2I/N). The variance calculator 27 determines a average variance value for the N signals from period sample sample buffer 21. The average variance is calculated according to the equation below:

$$\text{AVERAGE VARIANCE} = \frac{1}{N} \sum_{i=1}^{N} (\text{PERIOD SAMPLE } (i) - \text{PERIOD AVERAGE})^2$$

where N equals the number of locations in the period sample buffer 21. Each location in the period sample buffer 21 is identified as "PERIOD SAMPLE (i)" where i can be 1 to N. The variance for each PERIOD SAMPLE (i) is represented by the squared portion of the above equation, i.e. (PERIOD SAMPLE (i) - PERIOD AVERAGE)$^2$, where "PERIOD AVERAGE" is the output of divide by N circuit 25. The variance calculator outputs an analog signal representative of the average variance. The circuit implementation of the variance calculator 27 is shown in FIG. 2.

Figure 3:
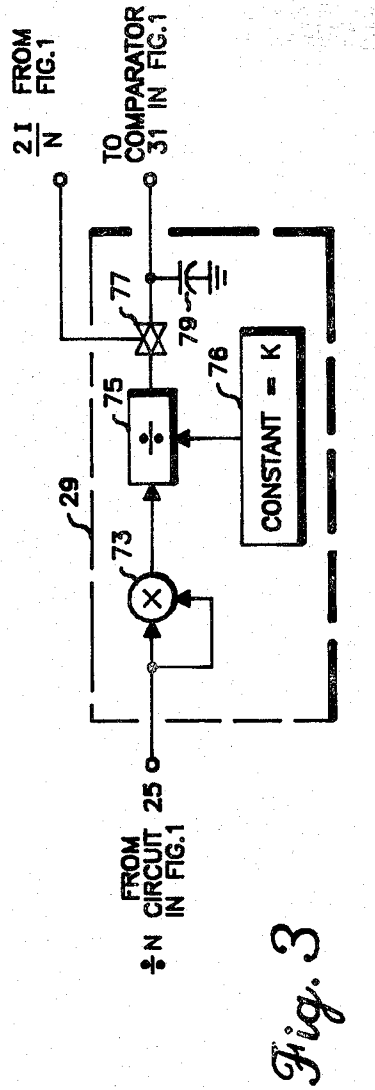
FIG. 3 is a circuit diagram of the variance reference threshold block of FIG. 1.

A variance reference threshold 29 receives the average period value from the divide by N circuit 25 at its load input. The variance reference threshold is calculated according to the equation below:

$$\text{VARIANCE THRESHOLD} = \frac{(\text{PERIOD AVERAGE})^2}{K}$$

where K is a constant (used to adjust the threshold value) and "PERIOD AVERAGE" is the average period calculated by summer circuit 23 and divide by N circuit 25. The analog output of the variance reference threshold 29 represents the maximum permissible average variance for a valid tone. If each sample period is significantly different but averages to a valid tone, the average variance will be above the threshold value. Therefore the decoder will not enable its detect output. The circuit implementation of the variance reference threshold 29 is shown in FIG. 3.

The results of the calculations by the variance calculator 27 and the variance reference threshold 29 are output to the A and B inputs of a comparator 31 which compares the two analog values and determines if the average variance from the variance calculator 29 is greater than the threshold value from the variance reference threshold 29. Comparator 31 is clocked by the secondary interrupt signal (2I/N). If the average variance from the period samples in the N period sample buffer 21 is less than or equal to the threshold value from the variance reference threshold 29 then the comparator 31 will output a binary signal (VARIANCE GOOD) to AND gates 33 and 44. AND gate 33 requires all three of its inputs to be activated before a signal will appear at its output. The second and third inputs to AND gate 33 are derived from determinations made in connection with frequency threshold filter 35.

When frequency threshold filter 35 receives the secondary interrupt signal (2I/N) at its clock input it compares the output from the divide by N circuit 25 with a series of analog values stored in the tone value storage circuit 37. If the average period output by the divide by N circuit 25 is within the range of any of the stored tone values in the tone value storage circuit 37 the frequency threshold filter 35 will output a binary signal (PERIOD GOOD) to the second input of AND gates 33 and 44. A second output of the frequency threshold filter 35 is a plurality of parallel outputs which are binary coded signals and represent the particular tone value detected by the frequency threshold filters 35. With every secondary interrupt signal (2I/N) a compare circuit 39 compares the parallel binary outputs from frequency threshold filter 35 with a binary value stored in RAM 41. If the binary value stored in RAM 41 equals the value of the parallel binary outputs of frequency threshold filter 35, a signal (A=B) is delivered to AND gate 33. Gate 40 inverts signal A=B to generate the signal A≠B.

Gate 44 is a 3 input AND gate whose output is connected to the load input of RAM 41 and the clear input of an integration counter 47 by way of OR gate 43. The A≠B signal from inverter gate 40 is a first input to AND gate 44. The second input to AND gate 44 is the PERIOD GOOD binary signal from the frequency threshold filters 35. The third input is the VARIANCE GOOD binary signal from comparator 31. When all three inputs to the AND gate 44 are activated the AND gate output will be activated and cause RAM 41 to load into storage the current binary coded tone signal present at the output of frequency threshold filter 35. The output of AND gate 44 will also clear the count in integration counter 47. The function of AND gate 44 will be explained more fully in connection with integration counter 47.

At the next secondary interrupt (2I/N) the compare circuit 39 will compare an updated output of frequency threshold filter 35 with the value in RAM 41. The value in RAM 41 always represents binary coded tone output from the frequency threshold filter 35 at the last secondary interrupt (2I/N) when the period good signal and variance good signal were activated. This is true since the AND gate 44 loads a new value into RAM 41 from the frequency threshold filters only when the new value is different than the present value and both the variance and period are good as indicated by the outputs from the frequency threshold filters 35 and comparator 31. If noise disrupts the valid tone temporarily the RAM will hold its value since the noise, although it will most likely cause a new binary output at frequency threshold filters 35, will not cause a variance good signal. All three conditions, i.e. period good, variance good and a new binary tone value, are required before the RAM 41 will be loaded with the new value.

Integration counter 47 has a clock input which receives the output pulses from AND gate 33. Activation of the output of AND gate 33 will occur at each secondary interrupt (2I/N) when there is a PERIOD GOOD signal from output of frequency threshold filter 35, a VARIANCE GOOD signal from comparator 31 and a A=B signal from compare circuit 39. Activation of all of these outputs means that a recognizable tone has been sensed (a valid tone period whose variance is less than a predetermined value) and the valid tone is the same frequency as the last valid tone sensed. With these conditions met the output of AND gate 33 will clock the integration counter 47 causing its stored count to increment by one.

If the frequency detected at the frequency threshold filter 35 changes value the comparison at compare circuit 39 will cause a signal (A≠B) at the output of inverter gate 40 indicating that the period of the tone is not the same as the period of the tone previously received (the previous period is stored in RAM 41). In such a case the output of AND gate 44 will be activated to cause integration counter 47 to clear its count. Compare circuit 39 performs a comparison at each secondary interrupt (2I/N). Similarly integration threshold compare circuit 45 compares the binary output of a integration counter 47 with the binary output of a threshold storage circuit 49 at each secondary interrupt (2I/N). If counter 47 reaches a count high enough that it becomes equal to or greater than the binary values stored in threshold storage 49 then a valid tone has been present for a sufficient period of time to merit a positive detection signal from integration threshold circuit 45 to the control unit 10. To implement this, integration threshold compare circuit 45 compares the output of integration counter 47 with the contents of threshold storage 49 and outputs a detect signal when the count in integration counter 47 is equal to or greater than the binary number stored in threshold storage 49. Threshold storage 49 is responsive to inputs from the frequency threshold filter 35. Each frequency, as represented by the binary states of the parallel outputs of the frequency threshold filter 35, has a time interval associated with it that is binary coded and stored in threshold storage 49. Threshold storage 49 acts as a look-up table for each tone frequency to determine what binary time value to compare in integration threshold compare circuit 45 with the binary time count in integration counter 47. The activated output of threshold compare circuit 45 indicates a detection of a valid tone for a minimum time necessary to insure a reliable tone detection.

In addition to serving as a clock for integration counter 47 the output of AND gate 33 also serves as the trigger input to one shot circuit 51 (activity flag). One shot 51 provides a pulse output in response to the output of AND gate 33 that is applied to a first input of two input OR gate 54. The output of OR gate 54 provides the retrigger input to retriggerable timer 53. The second input to OR gate 54 is the enable pulse from the one shot 11. As explained earlier the enable pulse also sets the flip-flop 12. When the retriggerable timer 53 times out it outputs a pulse from its $\overline{Q}$ output to the reset input of flip-flop 12. It also delivers a pulse to the control unit 10 to notify the operator (possibly by a indicator light) that no valid tone has been sensed in response to the operator's activation of the enable key. Preferrably the period of retriggerable timer 53 is a 60 millisecond period. Therefore if the activity flag signal by way of one shot 51 does not reset the retriggerable timer 53 more often than once every 60 milliseconds the retriggerable timer 53 will time out and will reset the flip-flop 12 which disables the interrupt signal (I). It should be noted that the time window for a valid tone detection as represented by retriggerable timer 53 can be changed to any desired time interval. A 60 millisecond time window is used in conjuction with the software implementation of the decoder according to the invention.

In operation, the operator at the control unit 10 activates the enable key which introduces an enable pulse to the decoder by way of one shot 11. The enable pulse initializes the decoder by clearing register 16, register storage 17, period sample buffer 21, RAM 41, integration counter 47 and triggering retriggerable timer 53. The enable pulse also activates flip-flop 12 so that the interrupt signals (I and 2I/N) sourcing from zero-crossing detector 13 are delivered to the decoder circuitry for processing. The decoder processes the interrupt signals from the zero-crossing detector 13 in the manner previously described. The operator at control unit 10 will receive either a valid tone detect as indicated by a detect indicator light on a control panel associated with the control unit 10 or the operator will receive a no detect indication (possibly by an indicator light) at the control unit 10. If a valid tone is detected, the tone value is determined from the output of the frequency threshold filter 35. The control unit 10 could have a series of indicator lights or a numeric display responsive to the binary output from the frequency threshold filter 35. The operator can react when a valid tone is detected by engaging in some predetermined activity associated with each tone. It should be noted that all circuits in the signal processing chain up to and including the variance reference threshold 29, the variance calculator 27 and the frequency threshold filter 35 of the decoder in FIG. 1, are analog devices. The outputs of the variance reference threshold 29, the variance calculator 27 and the frequency threshold filter 35 are binary signals. The remainder of the circuitry in the processing chain of the decoder are digital circuits.

FIG. 2 shows a circuit diagram for the variance calculator 27 shown in FIG. 1. The variance calculator 27 receives inputs from the period sample buffer 21 in FIG. 1 and the divide by N circuit 25 in FIG. 1. The N outputs from the period sample buffer 21 are each applied to a positive input of subtractor circuits 61(1)–61(N). Each subtractor circuit receives at its negative input the period average signal from divide by N circuit 25. Each output of the subtractor circuits 61(1)–61(N) is squared by multiplication circuits 63(1)–63(N). The resulting squared values from each of the multiplier circuits 63(1)–63(N) are added together in a summer circuit 65. The output of summer circuit 65, representing the sum of the outputs from multiplier circuits 63(1)–63(N), is applied to a divide by N circuit 67 which provides a analog output value representative of the average analog signal from multiplier circuits 63(1)–63(N).

The output from divide by N circuit 67 is applied to a transmission gate 69 whose gate input is responsive to the secondary interrupt signal (2I/N) Therefore, the output of the transmission gate 69 presents to a storage capacitor 71 the average value of the multiplier circuits 63(1)–63(N) only at every secondary interrupt (2I/N) The subtractor circuit 61(1)–61(N) calculate the difference between the average value of the N samples in the period sample buffer 21 and each individual period value. The difference can be positive or negative, therefore, the output is squared by multiplier circuits 63(1)–63(N) in order to remove any negative values that might be output from the subtractor circuits. The resulting analog output of the multiplier circuits 63(1)–63(N) represent the variance of each sample in the period sample buffer 21. The transmission gate 69 and capacitor 71 can be thought of as a sample and hold circuit which samples the output of the divide by N circuit 67 at every secondary interrupt (2I/N) and holds the output value until the next secondary interrupt (2I/N).

FIG. 3 shows a circuit diagram for the variance reference threshold 29 shown in FIG. 1. The average period from the divide by N circuit 25 is squared at multiplier 73 and then divided by a constant K at divider circuit 75. The analog value of the constant K is predetermined by the variance threshold level desired. The variance threshold level provides the major control over false detection of tones under noisy input signal conditions. The magnitude of constant K is inversely proportional to the detection sensitivity and falsing characteristics of the decoder. Generally, doubling the magnitude of the constant K causes system sensitivity to decrease by 3 db and exponentially increases the likelihood of a false detection (thus the signal-to-noise ratio would need to be 3 db higher for detection probability to stay the same). The value of the constant K can be adjusted empirically to the desired tradeoff between sensitivity and falsing. Unlike conventional tone decoders, the use of a constant K to set the detect threshold has the added benefit that it has no effect on the frequency detection bandwidth.

The output of the divider circuit 75 is applied to a transmission gate 77 which is gated by the secondary interrupt signal (2I/N). The output of the transmission gate 77 is applied to the comparator 31 in FIG. 1. The output of the transmission gate 77 is joined to a storage capacitor 79 which holds the analog value at the transmission gate output after the secondary interrupt (2I/N) has been removed. The multiplier circuit 73 squares the average period value in order for the output of the variance threshold calculator 29 to be compatible with the output of the variance calculator 27. The constant equals K block 76 is used to adjust the value of the analog output of the threshold variance calculator 29 to a level that insures sufficient accuracy in determining a valid tone. The transmission gate 77 and storage capacitor 79 act as a sample and hold circuit in a manner similar to the transmission gate 69 and capacitor 71 in FIG. 2.

Figure 4:
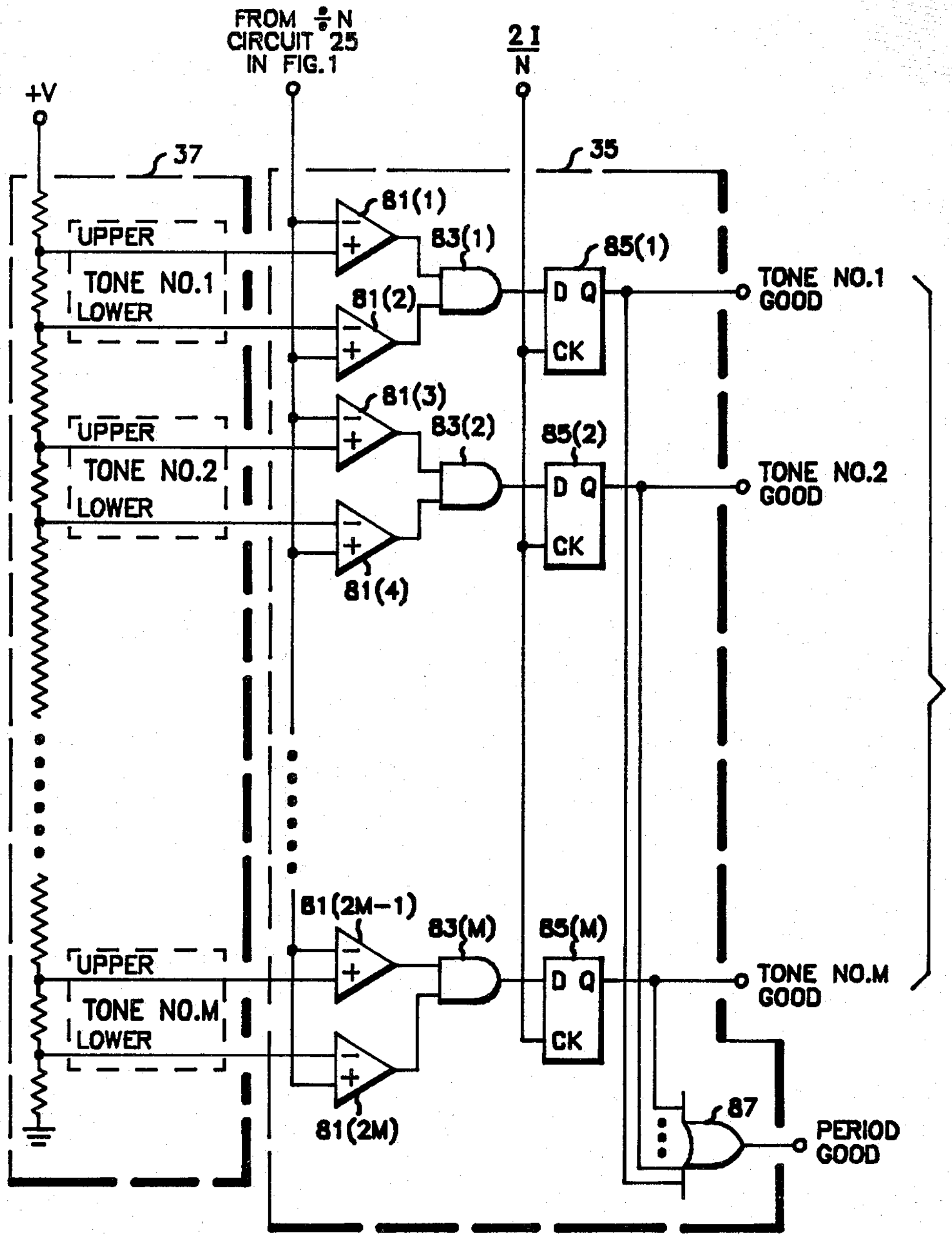
FIG. 4 is a circuit diagram of the frequency threshold filters block of FIG. 1.

FIG. 4 shows a circuit diagram for the tone frequency value storage 37 and the frequency threshold filter 35 in FIG. 1. The tone frequency value storage 37 is a resistive ladder with reference points chosen at appropriate locations in order to define analog levels which by system design are upper and lower limits of valid average periods from divide by N circuit 25 in FIG. 1. Each of these upper and lower reference values are input to the frequency threshold filter 35. In frequency threshold filter 35, each upper and lower analog reference voltage from the tone frequency value storage 37 is input to a operational amplifier 81(1)–81(M). There can be any number of identifiable tones stored in the tone frequency value storage 37. In FIG. 4 the tones are identified 1–M.

In the frequency threshold filter 35, two of the operational amplifiers 81(1)–81(2M) are required for detection of each tone. Therefore, the number of operational amplifiers is 2M. The operational amplifiers 81(1)–81(2M) are associated in pairs. The first operational amplifier of the pair receives the upper analog reference value for a given tone at its positive input. The lower analog reference voltage for the selected tone is input to the negative input of the second operational amplifier of the pair. The operational amplifiers 81(1)–81(2M) act as comparator circuits which have binary compatible outputs. Therefore, if the period average analog signal from the divide by N circuit 25 is between the upper and lower analog reference values for a given tone, the outputs of the associated operational amplifiers will both be logical highs. Two input AND gates 83(1)–83(M) receive the two outputs of the operational amplifiers that are paired together for the upper and lower limits of a given tone. Each output of the AND gates 83(1)–83(M) serves as the D input to D type flip-flops 85(1)–85(M). The clock input to each of the D type flip-flops 85(1)–85(M) is connected to the secondary interrupt signal (2I/N). Therefore, the D type flip-flops 85(1)–85(M) clock the outputs of AND gates 83(1)–83(M) to the Q output of the D type flip-flops upon reception of every secondary interrupt signal (2I/N). The outputs of the D type flip-flops 85(1)–85(M) are the parallel binary coded outputs of the frequency threshold filter 35 in FIG. 1. Each of the Q outputs of the D type flip-flops 85(1)–85(M) are input to a OR gate 87. The output of OR gate 87 is activated when any one of the Q outputs of the D type flip-flops 85(1)–85(M) are activated. Therefore, when the frequency threshold filter circuitry indicates that one of the M tones is present the output of OR gate 87 will indicate a PERIOD GOOD signal to AND gates 33 and 44 in FIG. 1.

Figure 5:
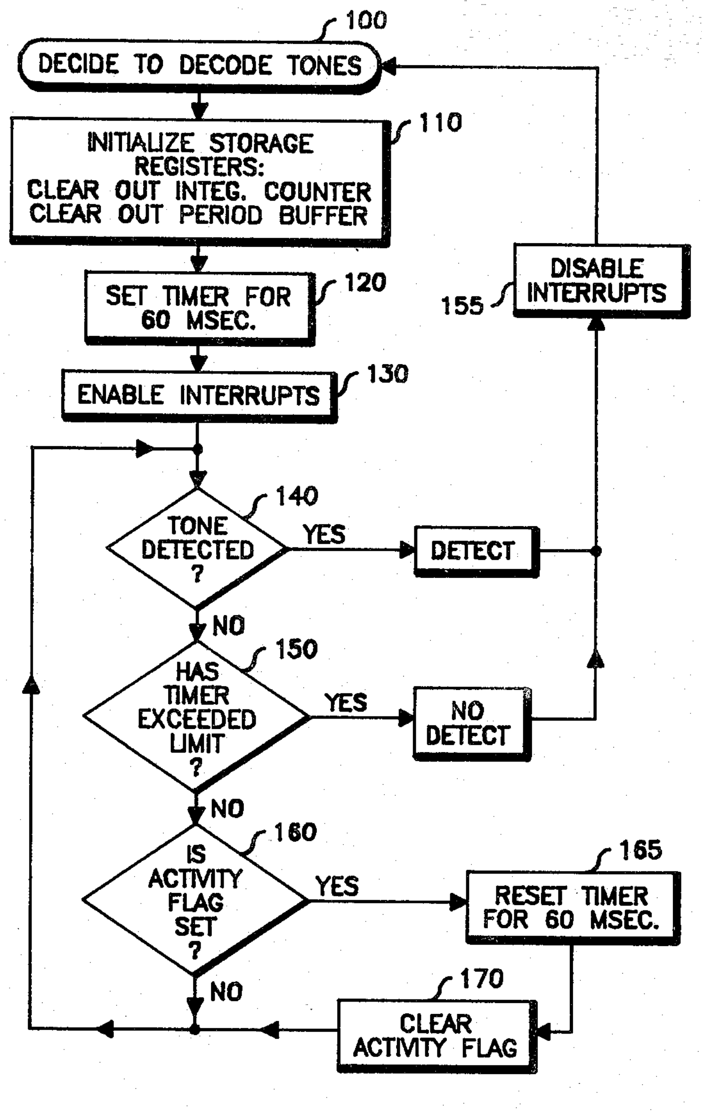
FIG. 5 is a flowchart of the background activity in a software embodiment of the transmitter decoder according to the invention.

FIG. 5 shows the background software flowchart for the preferred embodiment of a software implementation of the decoder circuit shown in FIG. 1. By analogy, the activity in the background software would be carried out by the control unit 10 and blocks 11, 12, 51, 53 and 54 in FIG. 1. The control unit for purposes of the preferred embodiment could be a microprocessor based circuit. In the first block 100 the transmitter must decide to decode incoming tones from a remote dispatch point. This event may occur when the equipment operator pushes the enable key on the control panel 10 in FIG. 1. In the preferred embodiment, this decision is made upon the successful detection of the "high level guard tone" signal discussed in connection with the background of the invention. With this decision made the flowchart moves to an initialization block 110 which initializes all the storage registers (such as register 16, register storage 17 and RAM 41 in FIG. 1) an integration counter (corresponding to integration counter 47 in FIG. 1) and the period buffer (corresponding to the period sample buffer 21 in FIG. 1). As part of the process of initialization the next block 120 retriggers the retriggerable timer for its 60 millisecond time-out period. The timer in block 120 corresponds by analogy to the retriggerable timer 53 in FIG. 1. As the last step before beginning decoding, block 130 enables the interrupt signal to the decoder circuitry. The interrupt signal corresponds to the signal I in FIG. 1 and is enabled by flip-flop 12 and AND gate 14. In FIG. 1 the transmitter site operator's decision to send an enable signal out to the decoder circuitry from control unit 10 operates to perform all the steps in blocks 100–130.

The transmitter will receive from the decoder one of three conditions after it has enabled the interrupt to the decoder circuitry. The first is a tone detect shown by decision block 140 in FIG. 5. By analogy if a tone is detected in the decoder of FIG. 1, a signal will appear at the detect input of the control unit 10. If no detection occurs then the transmitter may sense the time-out of the 60 millisecond timer. This is shown symbolically at decision block 150 in FIG. 5. If either a tone detect or a timer time-out has occurred, the interrupt is disabled in block 155, thereby holding the current values in the decoder and the software returns to block 100 to wait for the next decision to decode. If neither a tone detect nor a timer time-out has occurred then a signal at an activity flag output from the decoder will indicate to the transmitter whether the decoder is continuing to decode a valid signal or if there is no valid signal present in the decoder. This is represented by decision block 160 where a sensing of a signal by the activity flag will retrigger the 60 millisecond timer in block 165. The flowchart then moves to block 170 where the activity flag is cleared. From block 170 the software returns to block 140 for 60 milliseconds more of decoding time or if no activity flag is sensed the software returns to block 140 without renewing the timer time limit and clearing the activity flag.

Figure 6A:
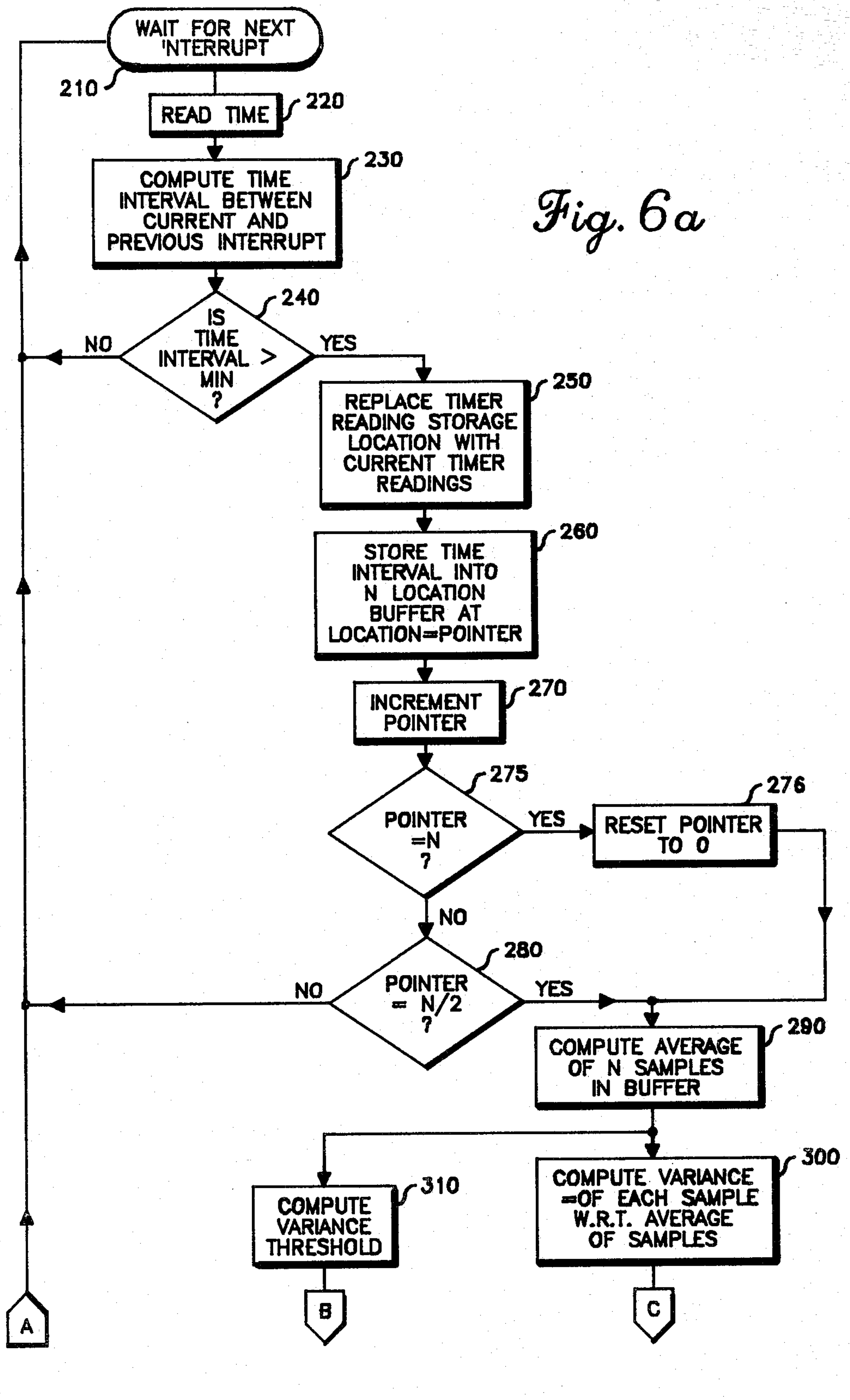
Figure 6B:
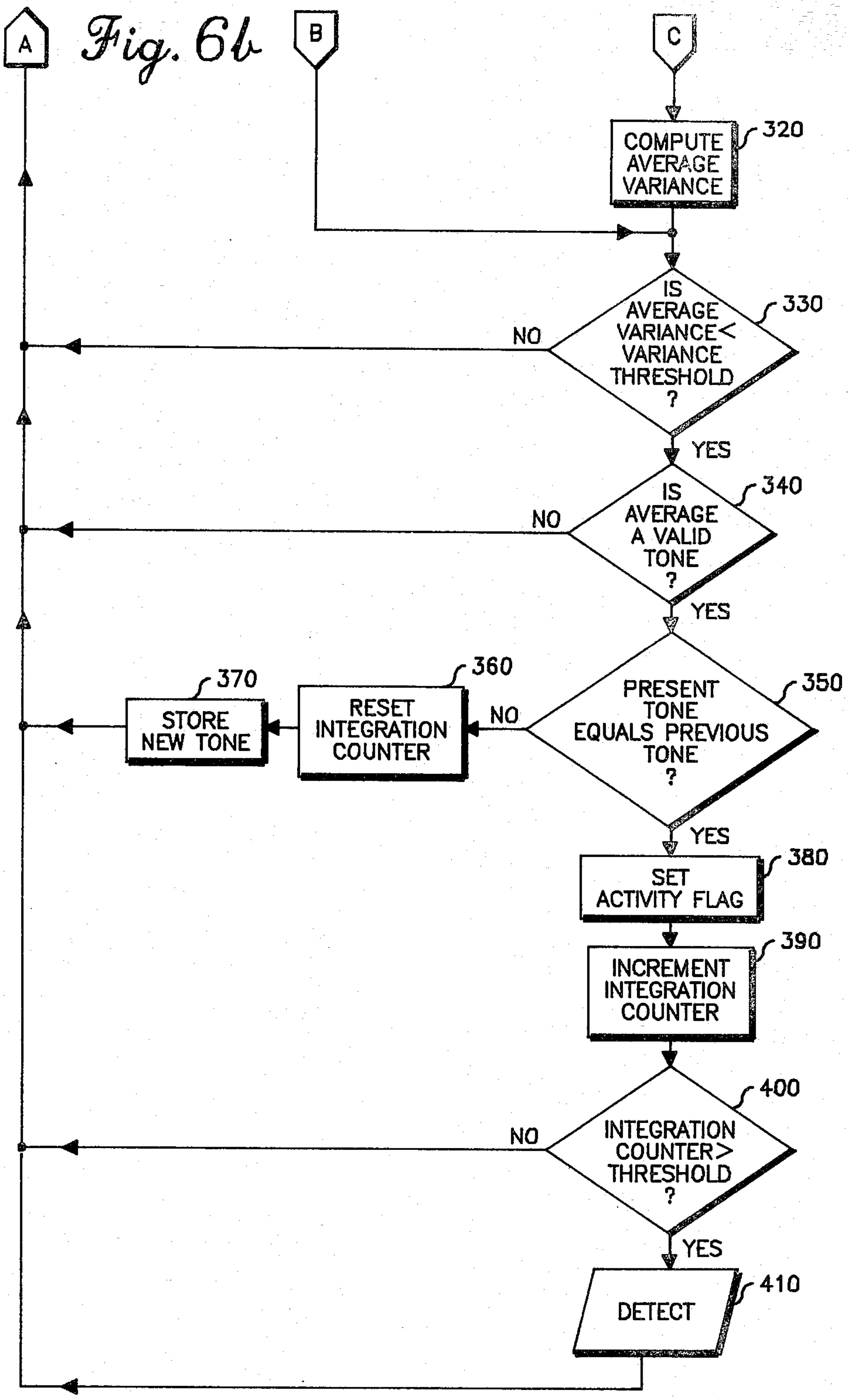

FIGS. 6A and 6B show the foreground software flowchart for the decoding operation shown by the circuit in FIG. 1. The first block 210 is a wait for next interrupt precondition. When the decoder receives an interrupt it moves to block 220 where it reads the time of the free running clock (corresponding to clock 18 in FIG. 1) by storing the value of the free running clock into a memory location (register 16 in FIG. 1). In computation block 230 the time interval between the current time reading and the time reading from the previous interrupt is calculated. This corresponds to the function of discriminator 19 in FIG. 1. Decision block 240 is designed to catch glitches or other obviously invalid time intervals before the software acts on such a time interval. If the time interval is less than some predetermined minimum value the flowchart will return for a wait for next interrupt precondition in block 210. If the time interval is greater than the minimum then the flowchart will move on to the next steps in decoding the received tone. There is no circuit block in FIG. 1 which corresponds to decision block 240 is FIG. 6A. Decision block 240 is not necessary for proper operation of either a hardware or software decoder according to the invention. Decision block 240 is included though in the preferred embodiment of the invention to protect the decoder from abnormally high input frequencies. If the time interval is greater than the minimum decision block 240 will lead to calculation block 250. Here the flowchart replaces the timer reading storage location with the current timer reading. This corresponds to the current reading in register 16 of FIG. 1 being stored into the register storage 17.

Activity block 260 stores the time interval computed in computation block 230 into a N location buffer at a location point determined by the value of a pointer flag. The pointer is analogous to the intermediate outputs from the divide by N/2 circuit 15 in FIG. 1. The pointer flag is a software device to keep track of the current location in memory. Activity block 260 corresponds to the function of the period sample buffer 21 in FIG. 1. In block 270 the value of the pointer flag is incremented by one to indicate the next location in the N location buffer. Decision block 275 asks if the pointer value is equal to N. This step is necessary since the N locations of the buffer are identified by 0 through $N-1$. If the answer is yes in decision block 275, the software moves to decision block 276 which resets the pointer to zero. The software then moves forward to computation block 290. If the answer is no in decision block 275 the software moves to decision block 280 which determines if the value of the pointer is N/2. If the pointer value is not equal to N/2 (and also necessarily not equal to 0 either) the flowchart returns to a wait for next interrupt precondition in block 210. If the pointer value is N/2 the flowchart moves on to further processing of the input signal at block 290. In the hardware embodiment of the invention in FIG. 1, this step is represented by divide by N/2 circuit 15 which generates the secondary interrupt signal (2I/N) to clock portion of the decoder circuitry. Decision block 280 is included in the software embodiment since calculating the average variance and average period each time an interrupt is received is very time consuming. From this fact it was determined that sufficient accuracy can be maintained with only two calculations of the average variance during a full cycle of a N location storage register where N equals 8 (the software storage locations are identified 0 through 7). With N equal to eight in decision block 280, if the pointer equals 4 the flowchart continues on to computation block 290 which computes the average time period for the N time periods stored in the N location buffer of block 260. This calculation corresponds to the function of summer 23 and divide by N circuit 25 in FIG. 1.

From computation block 290 the software flowchart branches off into two parts. In the first branch calculation block 300 computes the variance of each of the N periods with respect to the average period of the samples as determined by calculation block 290. In the second branch of the flowchart computation block 310 calculates the variance threshold as determined by the average period of the N samples calculated in calculation block 290. The calculation in computation block 300 corresponds to part of the function of the variance calculator 27 in FIG. 1. The calculations in computation block 310 corresponds to the function of the variance reference threshold circuit 29 in FIG. 1. After a variance has been computed for each sample in computation block 300 the software moves down to computation block 320 where a average variance is calculated. The activity in computation 320 corresponds to the remainder of the function of the variance calculator 27 in FIG. 1.

At this point in the flowchart the two parallel branches of the program join at decision block 330 to determine if the average variance is less than the variance threshold. If the average variance is greater than the variance threshold the flowchart returns to block 210 and waits for the next interrupt. If the average variance is less than the variance threshold then the flowchart continues to decode. Decision block 330 corresponds to the function of comparator 31 in FIG. 1. With the decision made in block 330 to continue decoding the flowchart moves on to decision block 340 to determine if the average time interval calculated in computation block 290 is one of the tones intended to be sensed by the decoder. Block 340 looks to see if the average time interval is a valid period. If the decision is no, the flowchart returns to the wait for the next interrupt block 210. If the decision is yes, the flowchart continues to decode the signal. Determining if the average is a valid period corresponds to the function of the frequency threshold filter 35 in FIG. 1.

From a yes decision in decision block 340 the flowchart moves on to decision block 350 where the software determines if the previous tone calculated is equal to the present tone. If the tones are not equal the integration counter (corresponding to integration counter 47 in FIG. 1) is reset in block 360 and the new tone is stored in memory in place of the previous tone in block 370. The flowchart then returns to the wait for next interrupt block 210. This decision path determines that the present tone is not the same frequency as that of the last calculated tone. Therefore neither the present or former calculated tone have not been present at the input of the decoder for a time period sufficient to indicate that either are valid tones. As such the old tone is forgotten and the new tone is stored into memory and referred to when the next calculation is done.

Decision block 350 and computation blocks 360, 370 correspond to compare circuit 39, RAM 41 and integration counter 47 in FIG. 1. The compare circuit 39 in FIG. 1 determines if the present tone is equal to the previous tone. The previous tone is stored in RAM 41. If the present tone and previous tone is not equal the RAM 41 is loaded with the present tone and thereby cleared of the previous tone. When loading the RAM 41 with the present tone the integration counter 47 is simultaneously cleared or reset.

If the present tone is equal to the previous tone the flowchart moves to computation block 380 which sets a software activity flag to denote that the decoder is sensing a valid tone and awaiting the passage of a sufficient period of time of continual sensing to insure the tone is being generated by something other than noise or some other type of interference. The activity flag of computation block 380 corresponds to the output of AND gate 33 in FIG. 1. As discussed in connection with FIG. 1, AND gate 33 will only have an active output when a detect signal from the frequency threshold filter 35, a variance good signal from comparator 31 and a A=B signal from compare circuit 39 are present at its inputs. As such the output indicates that a valid tone has been sensed and it is within the variance reference threshold, and the present valid tone is the same as the last received valid tone.

In computation block 390 in FIG. 3B the integration counter is incremented so as to indicate the valid tone has continued to be present at the decoder input for some predetermined amount of time. The software integration counter referenced in computation block 39 corresponds by analogy to the hardware integration counter 47 in FIG. 1. After the integration counter has been incremented in computation block 390 the flowchart moves to decision block 400 which looks to see if the integration counter has reached or exceeded its threshold value. If it has not, the flowchart returns to the wait for next interrupt block 210. If the threshold has been reached or exceeded the flowchart moves to a detect block 410. Decision block 400 which looks to see if the integration counter has reached or exceeded its threshold value. If it has not, the flowchart returns to the wait for next interrupt block 210. If the threshold has been reached or exceeded the flowchart moves to a detect block 410. Decision block 400 and detect block 410 correspond by analogy to the compare circuit 45 in FIG. 1. As discussed in connection with FIG. 1, the integration threshold compare circuit 45 compares the output of integration counter 47 with the output of threshold storage 49 and determines if the integration counter 47 output is equal to or greater than the value stored in threshold storage 49. For each tone there is a different time value to which the integration counter 47 must count up to before the integration threshold compare circuit 45 will issue a detect signal. Therefore the threshold storage 49 acts as a look up table for time periods corresponding to each of the valid tones. After the decoder has reached the detect block 410 it returns to the wait-for-next interrupt block 210 to start the decoding process again in response to the next interrupt.

I claim:

1. A method of accurately determining the presence of one of a group of desired frequency tones from a series of signals said method comprising the steps of:

a. sensing successive signals of said series of signals, b. determining the frequency periods of at least a portion of said successive signals, c. determining the average period of said frequency periods, d. determining the average variance for said frequency periods, e. determining a variance threshold from the value of the average period, f. determining if the average variance is less than said variance threshold to thereby indicate a good variance, g. determining if the average period is approximately equal to the average period of one of said group of desired frequency tones to thereby indicate a good period, h. determining if a good period and a good variance indication is present for a sufficient time to reliably indicate that said series of signals has a characteristic frequency period of one of said group of desired frequency tones.

2. A method of accurately determining the presence of one of a group of desired frequency tones from a series of signals according to claim 1 comprising the additional step of:

(i) causing the variance threshold determined in step e to be proportional to the square of the average period.

3. A tone decoder for decoding a series of input signals comprising:

period means for determining the frequency periods of at least a portion of said series of input signals, first averaging means responsive to said period means for determining the average period of said portion of said series of input signals, variance means responsive to said period means and said first averaging means for determining the variance from said average period of each signal in said portion of said series of input signals, second averaging means responsive to said variance means for determining an average variance, threshold means responsive to said first averaging means to produce a variance threshold and responsive to said second averaging means to produce a variance good signal if the average variance is less than said variance threshold, filter means responsive to said first averaging means to produce a period good signal and a binary coded tone signal if said average period is approximately equal to predetermined desired periods, memory means responsive to said binary coded tone signal to produce an output signal only when said binary coded tone signal corresponds to a binary coded tone signal presently stored in said memory means, and timing means responsive to said variance good signal, said period good signal and said memory means output signal to produce a detection signal only after said variance good signal, said period good signal and said output signal from said memory means have been present for a predetermined minimum time.

4. A tone decoder for decoding a series of input signals according to claim 3 wherein said memory means includes a comparison circuit for comparing said binary coded tone signal and said binary coded tone signal presently stored in said memory means and a storage circuit for storing said binary coded tone signal only when both said variance good signal and said period good signal are activated and said binary coded tone signal does not correspond to binary coded tone signal presently stored in said memory means.

5. A tone decoder for decoding a series of input signals according to claim 3 wherein said timing means includes an activity flag circuit responsive to the presence of said period good signal and said variance good signal and said memory means output signal to create a time window signal which causes the tone decoder to continue decoding input signals.

6. A tone decoder for decoding a series of input signals according to claim 5 wherein said time window signal is initialized only when said period good signal, said variance good signal, and said memory means output signal are present.

7. A tone decoder for decoding a series of input signals according to claim 6 wherein said activity flag circuit includes time out means responsive to said time window signal to produce an output signal when said time window signal is not reinitialized for a predetermined minimum time, whereby said time out means output signal causes said tone decoder to discontinue decoding input signals.

8. A decoder for decoding serially received signals comprising:

period means for calculating the period of at least a portion of said serially received signals, averaging means responsive to said period means for calculating an average period for said portion of said serially received signals, variance means responsive to said averaging means for calculating the average variance of said portion of said serially received signals, threshold means responsive to said averaging means to produce a variance threshold, and detection means responsive to said averaging means, said threshold means and said variance means to produce a detection signal only when said average period is approximately equal to the average period of one of a group of predetermined desired periods and said average variance remains below said variance threshold for a predetermined minimum time period.

9. A decoder for decoding serially received signals according to claims 3 or 8, wherein said variance threshold produced by said threshold means is proportional to the square of said average period.

10. A decoder for decoding serially received signals according to claim 8 wherein said detection means includes, a filter means responsive to said averaging means to produce an output period good signal and a binary coded tone signal if said average period is approximately equal to predetermined desired periods, memory means responsive to said binary coded tone signal to produce an output signal only when said binary coded tone signal of said filter means corresponds to a binary coded tone signal stored in said memory means, comparison means providing a variance good signal output when said average variance is less than said variance threshold, and timing means responsive to said output signals of said filter means, said comparison means and said memory means to produce a detection signal when said output signals of said filter means, said comparison means and said memory means have been present for a predetermined minimum time.

11. A decoder for decoding serially received signals according to claim 10 wherein said memory means includes a comparison circuit and a storage circuit, said storage circuit is responsive to store said binary coded tone signal only when both said variance good signal and said period good signal are activated and said binary coded tone signal does not correspond to said binary coded tone signal presently stored in said memory means.

12. A decoder for decoding serially received signals according to claim 10 wherein said timing means includes an activity flag circuit responsive to the presence of said period good signal, said variance good signal and said memory means output signal to produce a time window signal which causes the tone decoder to continue decoding signals.

* * * * *